United States Patent
Godin et al.

(10) Patent No.: US 12,432,623 B2
(45) Date of Patent: Sep. 30, 2025

(54) METHOD AND APPARATUS FOR SYSTEM PROVIDING MULTICAST SERVICES

(71) Applicant: NOKIA TECHNOLOGIES OY, Espoo (FI)

(72) Inventors: Philippe Godin, Versailles (FR); Horst Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 513 days.

(21) Appl. No.: 17/873,772

(22) Filed: Jul. 26, 2022

(65) Prior Publication Data
US 2023/0036207 A1    Feb. 2, 2023

(30) Foreign Application Priority Data
Jul. 30, 2021    (EP) .................................... 21188947

(51) Int. Cl.
*H04W 36/00*    (2009.01)
*H04W 4/06*    (2009.01)
*H04W 36/32*    (2009.01)

(52) U.S. Cl.
CPC ......... *H04W 36/0007* (2018.08); *H04W 4/06* (2013.01); *H04W 36/322* (2023.05)

(58) Field of Classification Search
CPC .. H04W 36/0007; H04W 4/06; H04W 36/322
See application file for complete search history.

(56) References Cited

U.S. PATENT DOCUMENTS

| | | | | |
|---|---|---|---|---|
| 11,503,437 | B2* | 11/2022 | Godin | H04W 76/27 |
| 2010/0265867 | A1* | 10/2010 | Becker | H04W 72/30 |
| | | | | 370/312 |
| 2014/0024375 | A1* | 1/2014 | Fitzpatrick | H04W 36/0085 |
| | | | | 455/436 |
| 2020/0329417 | A1* | 10/2020 | Huang | H04W 40/02 |
| 2021/0051071 | A1* | 2/2021 | Puente Pestana | H04M 15/07 |
| 2021/0105196 | A1* | 4/2021 | Dao | H04L 43/026 |
| 2021/0352444 | A1* | 11/2021 | Griot | H04W 28/0268 |
| 2023/0011492 | A1* | 1/2023 | Åkesson | H04W 4/10 |

(Continued)

FOREIGN PATENT DOCUMENTS

| | | |
|---|---|---|
| CN | 110431881 A | 11/2019 |
| CN | 110741680 A | 1/2020 |

(Continued)

OTHER PUBLICATIONS

LG Electronics, KI#6, Sol#20: Add area restriction info to NG-RAN, SA WG2 Meeting #142E (e-meeting) S2-2008532 Nov. 16-Nov. 20, 2020, Elbonia, 4 Pages (Year: 2020).*

(Continued)

*Primary Examiner* — Mounir Moutaouakil
(74) *Attorney, Agent, or Firm* — SQUIRE PATTON BOGGS (US) LLP

(57) ABSTRACT

A technique comprising: receiving, at a session management function, information by which is identifiable a plurality of multicast service areas for a multicast session managed by the session management function; and directing towards a radio access network node an indication of the plurality of multicast service areas; wherein the plurality of multicast service areas is a subset of the set of multicast service areas for the multicast session.

15 Claims, 5 Drawing Sheets

(56) References Cited

U.S. PATENT DOCUMENTS

| | | | |
|---|---|---|---|
| 2023/0036231 A1* | 2/2023 | Belling | H04W 4/06 |
| 2023/0292200 A1* | 9/2023 | Dai | H04W 36/08 |
| 2023/0362740 A1* | 11/2023 | Schliwa-Bertling | H04W 36/0016 |
| 2024/0056901 A1* | 2/2024 | Dai | H04W 36/0007 |
| 2024/0090078 A1* | 3/2024 | Godin | H04W 36/0007 |
| 2024/0137907 A1* | 4/2024 | Navratil | H04W 74/0833 |

FOREIGN PATENT DOCUMENTS

| | | | | |
|---|---|---|---|---|
| CN | 111770586 A | 10/2020 | | |
| CN | 112333788 A | 2/2021 | | |
| EP | 4125281 A1 * | 2/2023 | | H04W 36/0007 |
| WO | 20218/205100 A1 | 11/2018 | | |
| WO | 2021/098123 A1 | 5/2021 | | |

OTHER PUBLICATIONS

Chinese Office Action, with English machine translation, corresponding to CN Application No. 202210896611.3, dated Apr. 17, 2025.

* cited by examiner

METHOD AND APPARATUS FOR SYSTEM PROVIDING MULTICAST SERVICES

TECHNICAL FIELD

The present disclosure relates to apparatus, a method, and a computer program, and in particular to apparatus, methods and computer programs for a system providing multicast services.

BACKGROUND

A multicast session provided to user equipments via a radio access network may be provided in a plurality of local service areas (each local service area comprising one or more cells operated by one or more nodes of the radio access network) with some of the service content tailored to the local service area. A session management function managing a multicast session may provide information to a radio access network node about the multicast session.

SUMMARY

A method comprising: receiving, at a session management function, information by which is identifiable a plurality of multicast service areas for a multicast session managed by the session management function; and directing towards a radio access network node an indication of the plurality of multicast service areas; wherein the plurality of multicast service areas is a subset of the set of multicast service areas for the multicast session.

The radio access network node may comprise a node identified as a target node for a handover of a user equipment.

The information may originate from the target node.

The method may comprise receiving the information in a target node message carried by a message from an access management function.

The information may originate from an access management function.

The method may comprise receiving the information in an access management function message carrying a message from the radio access network node.

The method may comprise receiving the information at the session management function in reply to a request from the session management function.

The method may comprise sending the request from the session management function in response to receiving from an access management function a request from a user equipment to join the multicast session.

The method may comprise sending the request from the session management function to the access management function.

The method may comprise directing the request to the radio access network node.

The method may comprise receiving the information at the session management function together with a request from a user equipment to join the multicast session.

The information may be generated by the radio access network node in response to receiving from the user equipment a radio resource control message including an indicator indicating that the radio resource control message carries a request to join the multicast session; and the method may comprise receiving the information via an access management function.

The information may be generated by an access management function in response to receiving from the radio access network node a next generation application protocol message including an indicator indicating that the next generation application protocol message carries a request to join the multicast session.

The information may comprise a first list of tracking areas and cells, and the method may comprise identifying the plurality of multicast service areas from an intersection of the first list of tracking areas and cells, and a second list of tracking areas and cells belonging to the set of multicast service areas for the multicast session.

A method comprising: sending, from an access management function to a session management function, information by which is identifiable a plurality of multicast service areas for a multicast session managed by the session management function; receiving from the session management function an indication of the plurality of multicast service areas; and forwarding to a radio access network node the indication of the plurality of multicast service areas; wherein the plurality of multicast service areas is a subset of the set of multicast service areas for the multicast session.

The method may comprise sending the information in response to receiving a path switch request from the target radio access network node.

The path switch request may include the information, and the method may further comprise forwarding the information received from the target radio access network node to the session management function.

The information may be included in a message carried by the path switch request, and the method may comprise including the carried message in a message to the session management function.

The method may comprise retrieving the information in response to receiving the path switch request, and including the retrieved information in a message to the session management function.

The method may comprise sending the information to the session management function in response to a request from the session management function.

The method may comprise retrieving the information in response to determining that a message received from the radio access network node carries a join request from a user equipment to join a multicast session; and including the retrieved information in a message to the session management function carrying the join request.

The determining may be based on an indicator included by the radio access node in the message carrying the join request.

The method may comprise receiving the information in a message from the radio access network node carrying a join request from a user equipment to join the multicast session.

A method comprising: sending, from a radio access network node to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

The method may comprise sending the information to the session management function in a reply to a request from the session management function.

The method may comprise: retrieving the information in response to determining that a radio resource control message received from a user equipment carries a join request from the user equipment to join the multicast session; and including the retrieved information in a message to the access management function carrying the join request.

The determining may be based on an indicator included in the radio resource control message by the user equipment.

The method may comprise: retrieving the information in response to completing a handover for a user equipment and including the information in a path switch request towards the session management function via the access management function.

A method comprising: sending, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

The indicator may trigger the radio access node to forward the join request to the access management function together with information by which is identifiable a plurality of multicast service areas for the multicast session; wherein the plurality of multicast service areas is a subset of the set of multicast service areas for the multicast session.

The indicator may trigger the radio access node to forward the join request to the access management function together with an indicator triggering the access management function to forward the join request to the session management function together with information by which is identifiable a plurality of multicast service areas for the multicast session; wherein the plurality of multicast service areas is a subset of the set of multicast service areas for the multicast session.

The radio resource control message may comprise information by which is identifiable a plurality of multicast service areas for the multicast session; wherein the plurality of multicast service areas is a subset of the set of multicast service areas for the multicast session.

The information by which is identifiable a plurality of multicast service areas may comprise information by which is identifiable all multicast service areas associated with the radio access network node.

The information by which is identifiable a plurality of multicast service areas may define an area associated with the radio access network node.

The information by which is identifiable a plurality of multicast service areas may comprise at least one of: a list of tracking areas associated with the radio access network node; an identifier for the radio access network node; a list of cells associated with the radio access network node; a registration area identifier for a user equipment served by the radio access network node.

The information by which is identifiable a plurality of multicast service areas may define an area associated with the location of a user equipment.

The indication may be a context area.

Apparatus comprising: means for receiving information by which is identifiable a plurality of multicast service areas for a multicast session managed by the apparatus; and means for directing towards a radio access network node an indication of the plurality of multicast service areas; wherein the plurality of multicast service areas is a subset of the set of multicast service areas for the multicast session.

The radio access network node may comprise a node identified as a target node for a handover of a user equipment.

The information may originate from the target node.

The apparatus may comprise means for receiving the information in a target node message carried by a message from an access management function.

The information may originate from an access management function.

The apparatus may comprise means for receiving the information in an access management function message carrying a message from the radio access network node.

The apparatus may comprise means for receiving the information in reply to a request from the apparatus.

The apparatus may comprise means for sending the request in response to receiving from an access management function a request from a user equipment to join the multicast session.

The apparatus may comprise means for sending the request to the access management function.

The apparatus may comprise means for directing the request to the radio access network node.

The apparatus may comprise means for receiving the information together with a request from a user equipment to join the multicast session.

The information may be generated by the radio access network node in response to receiving from the user equipment a radio resource control message including an indicator indicating that the radio resource control message carries a request to join the multicast session; and the apparatus may comprise means for receiving the information via an access management function.

The information may be generated by an access management function in response to receiving from the radio access network node a next generation application protocol message including an indicator indicating that the next generation application protocol message carries a request to join the multicast session.

The information may comprise a first list of tracking areas and cells, and the apparatus may comprise means for identifying the plurality of multicast service areas from an intersection of the first list of tracking areas and cells, and a second list of tracking areas and cells belonging to the set of multicast service areas for the multicast session.

Apparatus comprising: means for sending, to a session management function, information by which is identifiable a plurality of multicast service areas for a multicast session managed by the session management function; means for receiving from the session management function an indication of the plurality of multicast service areas; and means for forwarding to a radio access network node the indication of the plurality of multicast service areas; wherein the plurality of multicast service areas is a subset of the set of multicast service areas for the multicast session.

The apparatus may comprise means for sending the information in response to receiving a path switch request from the target radio access network node.

The path switch request may include the information, and the apparatus may further comprise means for forwarding the information received from the target radio access network node to the session management function.

The information may be included in a message carried by the path switch request, and the apparatus may comprise means for including the carried message in a message to the session management function.

The apparatus may comprise means for retrieving the information in response to receiving the path switch request, and means for including the retrieved information in a message to the session management function.

The apparatus may comprise means for sending the information to the session management function in response to a request from the session management function.

The apparatus may comprise means for retrieving the information in response to determining that a message received from the radio access network node carries a join request from a user equipment to join a multicast session; and means for including the retrieved information in a message to the session management function carrying the join request.

The determining may be based on an indicator included by the radio access node in the message carrying the join request.

The apparatus may comprise means for receiving the information in a message from the radio access network node carrying a join request from a user equipment to join the multicast session.

Apparatus comprising: means for sending, to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

The apparatus may comprise means for sending the information to the session management function in a reply to a request from the session management function.

The apparatus may comprise: means for retrieving the information in response to determining that a radio resource control message received from a user equipment carries a join request from the user equipment to join the multicast session; and means for including the retrieved information in a message to the access management function carrying the join request.

The determining may be based on an indicator included in the radio resource control message by the user equipment.

The apparatus may comprise: means for retrieving the information in response to completing a handover for a user equipment and means for including the information in a path switch request towards the session management function via the access management function.

Apparatus comprising: means for sending, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

The indicator may trigger the radio access node to forward the join request to the access management function together with information by which is identifiable a plurality of multicast service areas for the multicast session; wherein the plurality of multicast service areas is a subset of the set of multicast service areas for the multicast session.

The indicator may trigger the radio access node to forward the join request to the access management function together with an indicator triggering the access management function to forward the join request to the session management function together with information by which is identifiable a plurality of multicast service areas for the multicast session; wherein the plurality of multicast service areas is a subset of the set of multicast service areas for the multicast session.

The radio resource control message may comprise information by which is identifiable a plurality of multicast service areas for the multicast session; wherein the plurality of multicast service areas is a subset of the set of multicast service areas for the multicast session.

The information by which is identifiable a plurality of multicast service areas may comprise information by which is identifiable all multicast service areas associated with the radio access network node.

The information by which is identifiable a plurality of multicast service areas may define an area associated with the radio access network node.

The information by which is identifiable a plurality of multicast service areas may comprise at least one of: a list of tracking areas associated with the radio access network node; an identifier for the radio access network node; a list of cells associated with the radio access network node; a registration area identifier for a user equipment served by the radio access network node.

The information by which is identifiable a plurality of multicast service areas may define an area associated with the location of a user equipment.

The indication may be a context area.

Apparatus comprising: at least one processor; and at least one memory including computer program code, the at least one memory and computer program code configured to, with the at least one processor, cause the apparatus to perform: managing a multicast session; receiving information by which is identifiable a plurality of multicast service areas for the multicast session; and directing towards a radio access network node an indication of the plurality of multicast service areas; wherein the plurality of multicast service areas is a subset of the set of multicast service areas for the multicast session.

The radio access network node may comprise a node identified as a target node for a handover of a user equipment.

The information may originate from the target node.

The at least one memory and computer program code may be configured to, with the at least one processor, cause the apparatus to: receive the information in a target node message carried by a message from an access management function.

The information may originate from an access management function.

The at least one memory and computer program code may be configured to, with the at least one processor, cause the apparatus to receive the information in an access management function message carrying a message from the radio access network node.

The at least one memory and computer program code may be configured to, with the at least one processor, cause the apparatus to receive the information in reply to a request from the session management function.

The at least one memory and computer program code may be configured to, with the at least one processor, cause the apparatus to send the request in response to receiving from an access management function a request from a user equipment to join the multicast session.

The at least one memory and computer program code may be configured to, with the at least one processor, cause the apparatus to send the request to the access management function.

The at least one memory and computer program code may be configured to, with the at least one processor, cause the apparatus to direct the request to the radio access network node.

The at least one memory and computer program code may be configured to, with the at least one processor, cause the apparatus to receive the information together with a request from a user equipment to join the multicast session.

The information may be generated by the radio access network node in response to receiving from the user equipment a radio resource control message including an indicator indicating that the radio resource control message carries a request to join the multicast session; and the at least one memory and computer program code may be configured to, with the at least one processor, cause the apparatus to receive the information via an access management function.

The information may be generated by an access management function in response to receiving from the radio access network node a next generation application protocol message including an indicator indicating that the next generation application protocol message carries a request to join the multicast session.

The information may comprise a first list of tracking areas and cells, and the at least one memory and computer program code may be configured to, with the at least one processor, cause the apparatus to identify the plurality of multicast service areas from an intersection of the first list of tracking areas and cells, and a second list of tracking areas and cells belonging to the set of multicast service areas for the multicast session.

An apparatus comprising: at least one processor; and at least one memory including computer program code, the at least one memory and computer program code configured to, with the at least one processor, cause the apparatus to perform: sending, to a session management function, information by which is identifiable a plurality of multicast service areas for a multicast session managed by the session management function; receiving from the session management function an indication of the plurality of multicast service areas; and forwarding to a radio access network node the indication of the plurality of multicast service areas; wherein the plurality of multicast service areas is a subset of the set of multicast service areas for the multicast session.

The at least one memory and computer program code may be configured to, with the at least one processor, cause the apparatus to send the information in response to receiving a path switch request from the target radio access network node.

The path switch request may include the information, and the at least one memory and computer program code may be configured to, with the at least one processor, cause the apparatus to forward the information received from the target radio access network node to the session management function.

The information may be included in a message carried by the path switch request, and the at least one memory and computer program code may be configured to, with the at least one processor, cause the apparatus to include the carried message in a message to the session management function.

The at least one memory and computer program code may be configured to, with the at least one processor, cause the apparatus to retrieve the information in response to receiving the path switch request, and include the retrieved information in a message to the session management function.

The at least one memory and computer program code may be configured to, with the at least one processor, cause the apparatus to send the information to the session management function in response to a request from the session management function.

The at least one memory and computer program code may be configured to, with the at least one processor, cause the apparatus to retrieve the information in response to determining that a message received from the radio access network node carries a join request from a user equipment to join a multicast session; and include the retrieved information in a message to the session management function carrying the join request.

The determining may be based on an indicator included by the radio access node in the message carrying the join request.

The at least one memory and computer program code may be configured to, with the at least one processor, cause the apparatus to receive the information in a message from the radio access network node carrying a join request from a user equipment to join the multicast session.

An apparatus comprising: at least one processor; and at least one memory including computer program code, the at least one memory and computer program code configured to, with the at least one processor, cause the apparatus to perform: sending, to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

The at least one memory and computer program code may be configured to, with the at least one processor, cause the apparatus to send the information to the session management function in a reply to a request from the session management function.

The at least one memory and computer program code may be configured to, with the at least one processor, cause the apparatus to retrieve the information in response to determining that a radio resource control message received from a user equipment carries a join request from the user equipment to join the multicast session; and include the retrieved information in a message to the access management function carrying the join request.

The determining may be based on an indicator included in the radio resource control message by the user equipment.

The at least one memory and computer program code may be configured to, with the at least one processor, cause the apparatus to retrieve the information in response to completing a handover for a user equipment and include the information in a path switch request towards the session management function via the access management function.

An apparatus comprising: at least one processor; and at least one memory including computer program code, the at least one memory and computer program code configured to, with the at least one processor, cause the apparatus to perform: sending, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

The indicator may trigger the radio access node to forward the join request to the access management function together with information by which is identifiable a plurality of multicast service areas for the multicast session; wherein the plurality of multicast service areas is a subset of the set of multicast service areas for the multicast session.

The indicator may trigger the radio access node to forward the join request to the access management function together with an indicator triggering the access management function to forward the join request to the session management function together with information by which is identifiable a plurality of multicast service areas for the multicast session; wherein the plurality of multicast service areas is a subset of the set of multicast service areas for the multicast session.

The radio resource control message may comprise information by which is identifiable a plurality of multicast service areas for the multicast session; wherein the plurality of multicast service areas is a subset of the set of multicast service areas for the multicast session.

The information by which is identifiable a plurality of multicast service areas may comprise information by which is identifiable all multicast service areas associated with the radio access network node.

The information by which is identifiable a plurality of multicast service areas may define an area associated with the radio access network node.

The information by which is identifiable a plurality of multicast service areas may comprise at least one of: a list of tracking areas associated with the radio access network node; an identifier for the radio access network node; a list of cells associated with the radio access network node; a registration area identifier for a user equipment served by the radio access network node.

The information by which is identifiable a plurality of multicast service areas may define an area associated with the location of a user equipment.

The indication may be a context area.

Apparatus comprising: receiving circuitry for receiving information by which is identifiable a plurality of multicast service areas for a multicast session managed by the apparatus; and directing circuitry for directing towards a radio access network node an indication of the plurality of multicast service areas; wherein the plurality of multicast service areas is a subset of the set of multicast service areas for the multicast session.

Apparatus comprising: sending circuitry for sending, to a session management function, information by which is identifiable a plurality of multicast service areas for a multicast session managed by the session management function; receiving circuitry for receiving from the session management function an indication of the plurality of multicast service areas; and forwarding circuitry for forwarding to a radio access network node the indication of the plurality of multicast service areas; wherein the plurality of multicast service areas is a subset of the set of multicast service areas for the multicast session.

Apparatus comprising: sending circuitry for sending, to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

Apparatus comprising: sending circuitry for sending, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

A computer readable medium comprising program instructions stored thereon for performing: receiving, at a session management function, information by which is identifiable a plurality of multicast service areas for a multicast session managed by the session management function; and directing towards a radio access network node an indication of the plurality of multicast service areas; wherein the plurality of multicast service areas is a subset of the set of multicast service areas for the multicast session.

A computer readable medium comprising program instructions stored thereon for performing: sending, from an access management function to a session management function, information by which is identifiable a plurality of multicast service areas for a multicast session managed by the session management function; receiving from the session management function an indication of the plurality of multicast service areas; and forwarding to a radio access network node the indication of the plurality of multicast service areas; wherein the plurality of multicast service areas is a subset of the set of multicast service areas for the multicast session.

A computer readable medium comprising program instructions stored thereon for performing: sending, from a radio access network node to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

A computer readable medium comprising program instructions stored thereon for performing: sending, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

A computer program comprising computer executable code which when run on at least one processor is configured to cause an apparatus at least to: receive, at a session management function, information by which is identifiable a plurality of multicast service areas for a multicast session managed by the session management function; and direct towards a radio access network node an indication of the plurality of multicast service areas; wherein the plurality of multicast service areas is a subset of the set of multicast service areas for the multicast session.

A computer program comprising computer executable code which when run on at least one processor is configured to cause an apparatus at least to: send, from an access management function to a session management function, information by which is identifiable a plurality of multicast service areas for a multicast session managed by the session management function; receive from the session management function an indication of the plurality of multicast service areas; and forward to a radio access network node the indication of the plurality of multicast service areas; wherein the plurality of multicast service areas is a subset of the set of multicast service areas for the multicast session.

A computer program comprising computer executable code which when run on at least one processor is configured to cause an apparatus at least to: send, from a radio access network node to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

A computer program comprising computer executable code which when run on at least one processor is configured to cause an apparatus at least to: send, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

A non-transitory computer readable medium comprising program instructions stored thereon for performing: receiving, at a session management function, information by which is identifiable a plurality of multicast service areas for a multicast session managed by the session management function; and directing towards a radio access network node an indication of the plurality of multicast service areas; wherein the plurality of multicast service areas is a subset of the set of multicast service areas for the multicast session.

A non-transitory computer readable medium comprising program instructions stored thereon for performing: sending, from an access management function to a session management function, information by which is identifiable a plurality of multicast service areas for a multicast session managed by the session management function; receiving from the session management function an indication of the plurality of multicast service areas; and forwarding to a radio access network node the indication of the plurality of multicast service areas; wherein the plurality of multicast service areas is a subset of the set of multicast service areas for the multicast session.

A non-transitory computer readable medium comprising program instructions stored thereon for performing: sending, from a radio access network node to a session management function or to an access management function for forwarding to a session management function, information by which is identifiable a plurality of multicast service areas for a multicast session managed by the session management function; wherein the plurality of multicast service areas is a subset of the set of multicast service areas for the multicast session.

A non-transitory computer readable medium comprising program instructions stored thereon for performing: sending, to a radio access network node for forwarding to a session management function via an access management function, a radio resource control message carrying a join request to join a multicast session managed by the session management function, wherein the radio resource control message comprises an indicator indicating that the carried message is a join request to join the multicast session.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

The following description of example embodiments makes mention of systems (user equipments, RAN nodes, core network nodes) operating according to specific 3GPP protocols (e.g. 5G protocol), but the underlying technique is also applicable to systems operating according to other protocols, such as more evolved 3GPP protocols.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
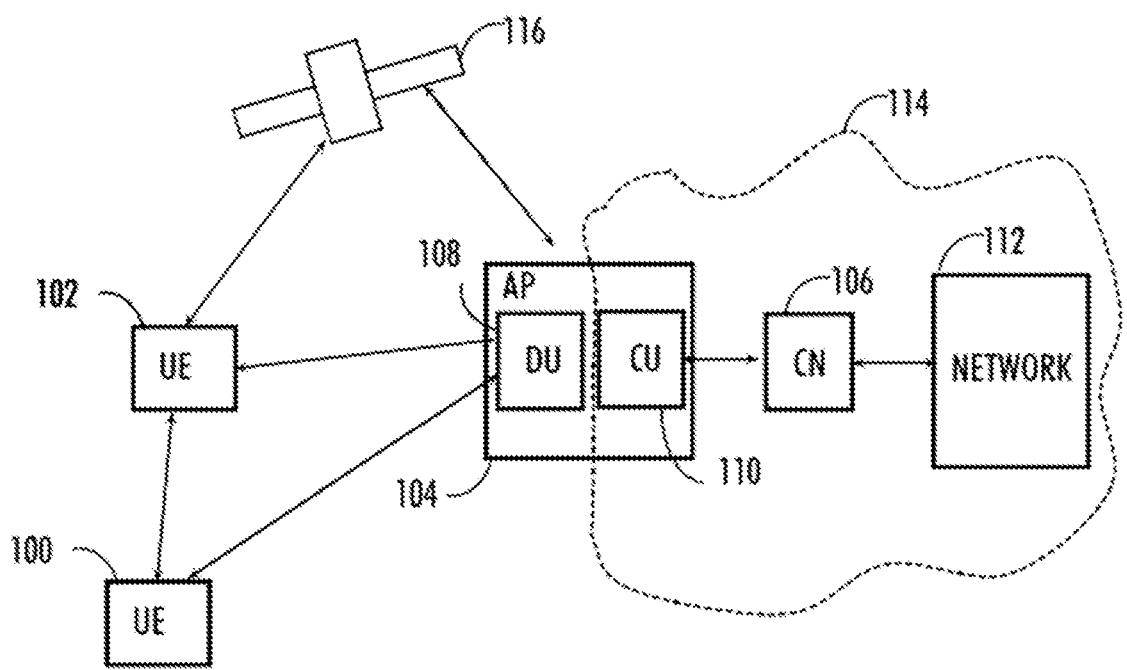
FIG. 1 illustrates an example system to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. For example, the radio access network may support sidelink communications described below in more detail.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without a universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is clear to a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
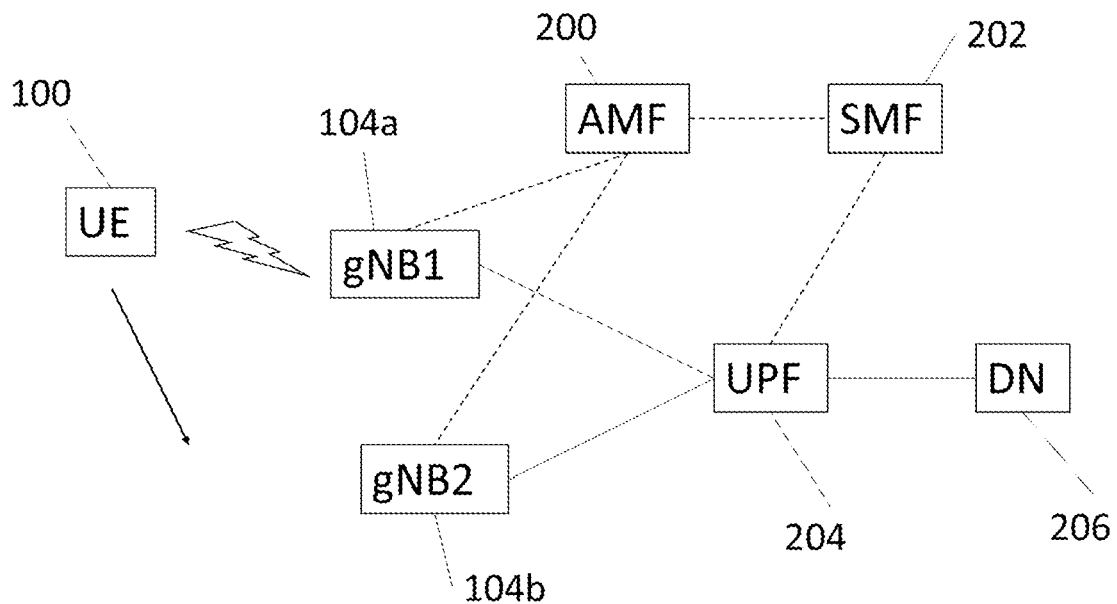
FIG. 2 shows a representation of 5G system components used in example embodiments.

FIG. 2 shows a representation of 3GPP 5G system components used in example embodiments. This FIG. 2 and the following description focusses on the example of providing multicast or broadcast services (MBS) via a 5G system, but the techniques are also applicable to providing MBS via other systems, such as e.g. more evolved 3GPP systems. FIG. 2 shows a small number of nodes for ease of explanation, but a 5G system may comprise a plurality of nodes implementing access management functionality, a plurality of nodes implementing session management functionality, and a plurality of nodes implementing user plane functionality. In this example, the term "user equipment" here refers to any device, apparatus or component implementing user equipment functionality; and may include, for example, vehicles or other machinery implementing UE functionality.

Data for a multicast session is provided to a plurality of user equipments (UE) 100 (which may, for example, include the UE in FIG. 1) from a data network 206 via a node 204 implementing user plane functionality, and one or more radio access network nodes (base station gNB) 104. The radio access network nodes may, for example, include the node 104 in FIG. 1.

A multicast session of a location-dependent multicast service may be provided in a set of local service areas, with some content tailored to the respective local service area. A local service area may comprise one or more cells forming a subset of all the cells operated by the nodes of the radio access network.

A local service area may, for example, be defined by a list of cells (operated by one or more gNBs 104 of the radio access network), or a respective list of tracking areas (TAs). A TA is a grouping of cells (operated by one or more gNBs104 of the radio access network) to facilitate searching for a UE across a network without excessive signalling.

A location-dependent multicast session in a local service area is identified by a common session ID (referred to as MBS Session ID) common to all local service areas of the full set of service areas for the multicast session, and an Area Session ID specific to the local service area. UE 100 is only aware of the MBS Session ID. The UE 100 includes the MBS Session ID in a join request to join multicast session.

The ingress point for a multicast session for a location-dependent multicast service may change depending on the local service area (Area Session ID). The ingress point for the multicast session (identified by the MBS Session ID) for one local service area may not be the same ingress point as that for the same multicast session (identified by the MBS Session ID) for another local service area. Similarly, the nodes implementing session management functionality and/or user plane functionality may change depending on the local service area (Area Session ID). The node implementing session management functionality for the multicast session (identified by the MBS Session ID) for one local service area may not be the same node as that implementing control plane session management functionality for the same multicast session (identified by the MBS Session ID) for another local service area; and/or the node implementing user plane functionality for the multicast session for one local service area may not be the same node as that implementing user plane functionality for the same multicast session (identified by the MBS Session ID) for another local service area.

As described below for various example embodiments, a session management function managing a multicast session may provide information to gNBs 104 about the local service areas for the multicast session.

Figure 3:
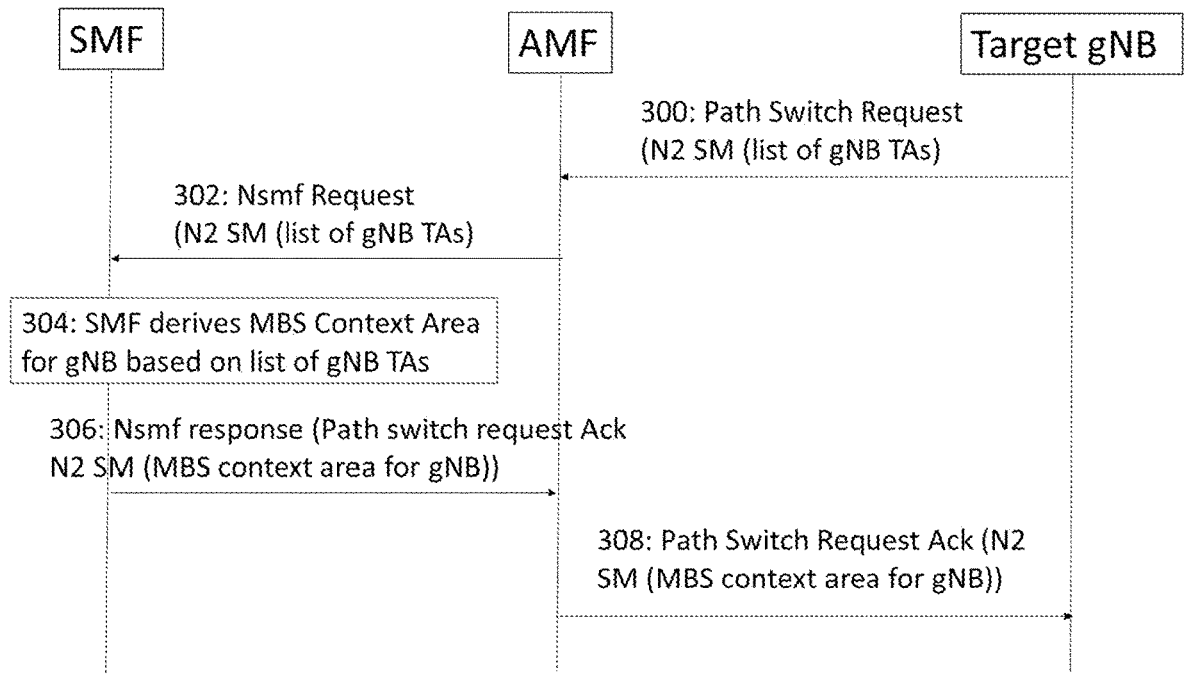
FIG. 3 shows a representation of an example of operations at components of FIG. 2 according to example embodiments.

FIG. 3 shows a representation of an example of operations at components of FIG. 2 according to an example embodiment.

A gNB 104b has been identified as a target gNB for a handover of UE 100 that has already joined a location-dependent multicast session.

Target gNB 104b sends a Path Switch Request message to AMF 200 (OPERATION 300). The Path Switch Request Transfer IE (N2 SM (session management) container for exchanging information between gNB 104b and SMF 202 transparently to AMF 200) carried by the Path Switch Request message includes the list of TAs supported by the target gNB 104b.

The path switch request is a request for tunnels to be moved from the source gNB (serving gNB) 104a to the target gNB 104b and for informing AMF of the change of serving gNB for the UE. Once the path switch request is acknowledged, data can flow from UE 100 through the target node 104b and on to the prescribed UPF.

AMF 200 forwards the Path Switch Request Transfer container to SMF 202 in a Nsmf request message (OPERATION 302).

SMF 202 derives a context area (hereafter referred to as MBS context area) for the target gNB 104b based on the list of TAs included in the received Path Switch Request Transfer container (OPERATION 304). The MBS context area selectively comprises a list of local service areas (identified by respective Area Session IDs) that map to the list of TAs received at the SMF. The MBS context area does not include the complete set of local service areas for the multicast session across the PLMN; the MBS context area identifies a sub-set of the complete set. Each local service area is expressed and known at the SMF 202 as a list of tracking area identifiers (TAIs) and cells. The MBS context area comprises an intersection of (a) the TAIs received at the SMF 202 in the Nsmf request message, and (b) the collection of TAIs and cells that define the whole set of local service areas for the multicast session. The MBS context area=list of (Area Session ID, (list of TAIs and cells)).

SMF 202 sends the MBS context area for the target gNB 104b to AMF 200 for forwarding to the target gNB (OPERATION 306). SMF 202 includes the MBS context area for target gNB 104 in a Path Switch Request ACK N2 SM carried by a Nsmf response message to AMF 200.

AMF 200 sends the Path Switch Request ACK N2 SM carried by the received Nsmf response message to the target gNB 104b (OPERATION 308).

Figure 4:
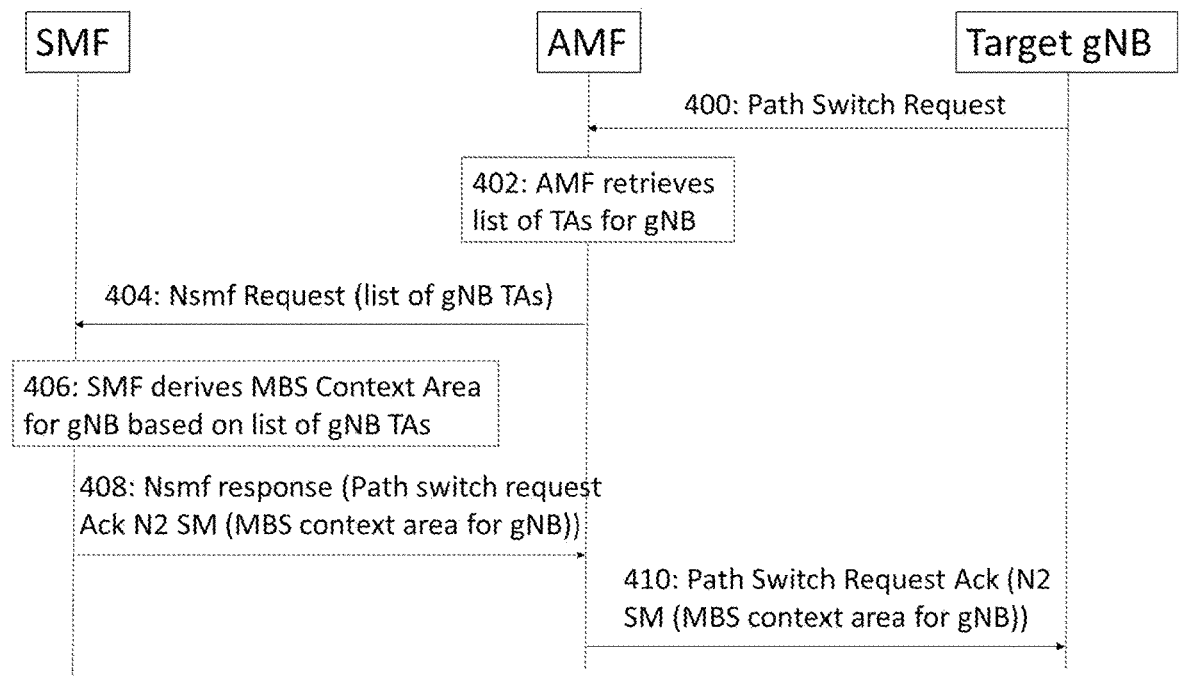
FIG. 4 shows a representation of another example of operations at components of FIG. 2 according to example embodiments.

FIG. 4 shows a representation of another example of operations at components of FIG. 2 according to another example embodiment. This FIG. 4 example is the same as that of the FIG. 3 example except that the target eNB 104 does not include the list of TAs supported by the target gNB in the Path Switch Request Transfer container included in the Path Switch Request message sent to AMF 200. Instead, in response to receiving the Path Switch Request from target gNB 104b, AMF 200 retrieves from AMF memory the list of TAs supported by the target gNB 104b.

With reference to FIG. 4: target gNB 104b sends to AMF 200 the Path switch Request message including a Path Switch Request Transfer container for forwarding from AMF 200 to SMF 202 (OPERATION 400). The Path Switch Request Transfer container does not include a list of TAs supported by the target gNB 104b.

In response to receiving the Path Switch Request from target gNB 104b, AMF 200 retrieves from AMF memory the list of TAs supported by the target gNB (received earlier by AMF 200 in an NG-RAN setup procedure) (OPERATION 402).

AMF 200 includes the retrieved list of TAs supported by target gNB 104b in a Nsmf request message carrying the Path Switch Request Transfer container to SMF 202 (OPERATION 404).

Subsequent OPERATIONS 406, 408 and 410 are the same as OPERATIONS 304, 306 and 308, respectively, of the example of FIG. 3.

Figure 5:
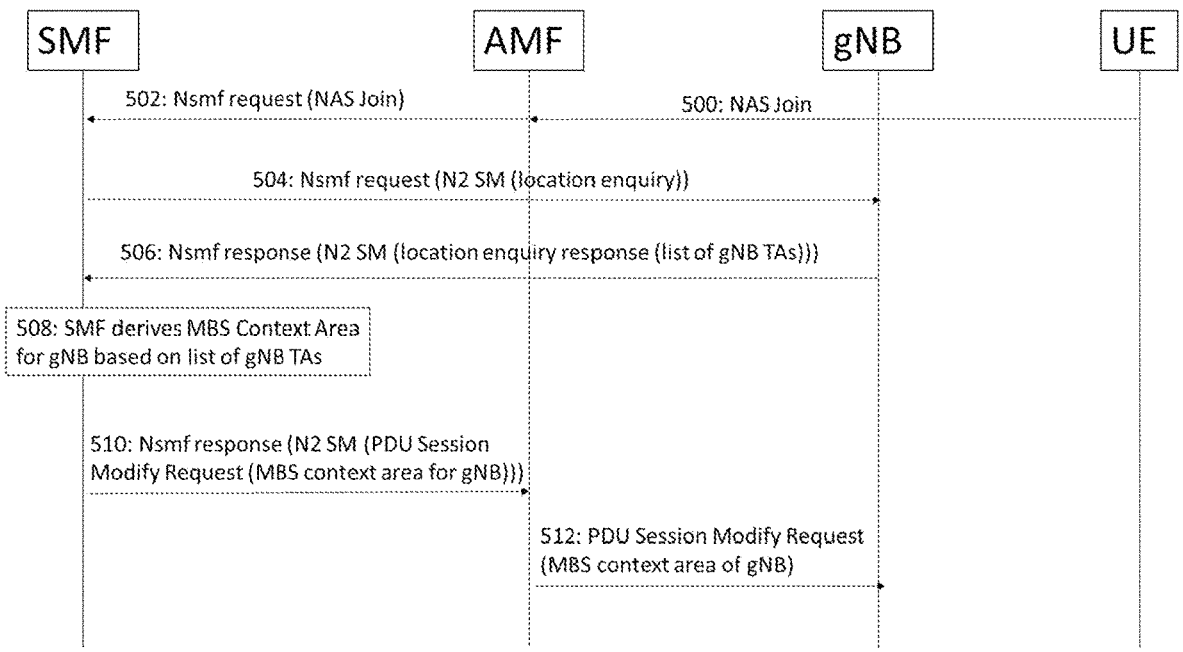
FIG. 5 shows a representation of another example of operations at components of FIG. 2 according to example embodiments.

FIG. 5 shows a representation of another example of operations at components of FIG. 2 according to another example embodiment.

The example of FIG. 5 relates to a location-dependent multicast session to which UE 100 has not yet joined.

UE 100 sends a request to join the multicast session (OPERATION 500). The NAS Join request specifies the MBS Session ID for the location-dependent multicast session. UE 100 sends the NAS Join request for forwarding by serving gNB 104a to AMF 200.

AMF 200 forwards the received NAS Join request to the SMF 202 managing the identified multicast session (OPERATION 502). In more detail, AMF 200 sends to SMF 202 a Nsmf request carrying the received NAS Join request.

In response to receiving the NAS Join request, SMF 202 sends a Nsmf request to AMF 200 carrying a UE-associated N2 SM location enquiry message for AMF 200 to forward to serving gNB 104a (OPERATION 504).

In response to receiving the location enquiry message from AMF 200, serving gNB 104a sends to AMF 200 for forwarding to SMF 202 a location enquiry response including a list of TAs supported by serving gNB 104b (OPERATION 506). AMF 200 sends to SMF 202 a Nsmf response carrying the location enquiry response received from serving gNB 104a.

SMF 202 derives the MBS context area for the serving gNB 104a based on the list of TAs included in the location enquiry response from serving gNB 104a via AMF 200 (OPERATION 508). This OPERATION 508 is the same as that of OPERATION 304 of the FIG. 3 example.

SMF 202 includes the derived MBS context area for serving gNB 104a in a PDU Session Modify Request Transfer container for forwarding by AMF 200 to serving gNB 104a. SMF 202 includes the PDU Session Modify Request Transfer in a Nsmf response to AMF 200 (OPERATON 510).

AMF 200 forwards the MBS Context Area for serving gNB 104 within the PDU session modify request (or PDU session setup request) message to serving gNB 104a (OPERATION 512).

Figure 6:
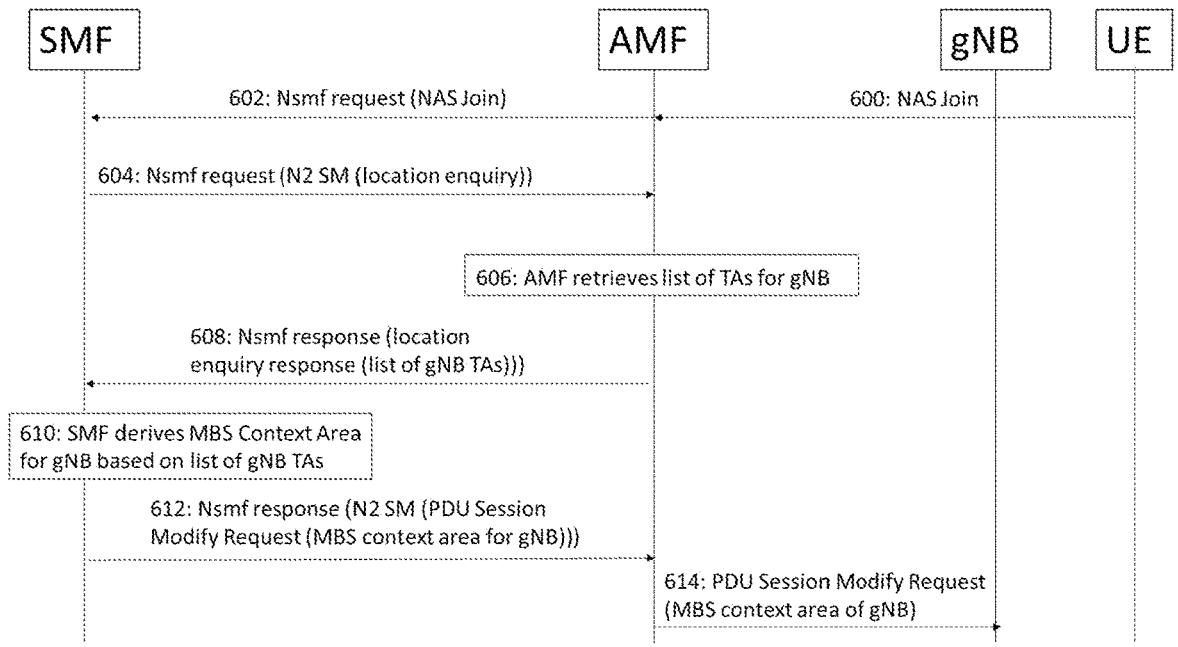
FIG. 6 shows a representation of another example of operations at components of FIG. 2 according to example embodiments.

FIG. 6 shows a representation of another example of operations at components of FIG. 2 according to another example embodiment. This FIG. 6 example is the same as the FIG. 5 example except that the SMF 202 obtains the list of TAs supported by serving gNB 104*a* from AMF 200 without involving the serving gNB 104*a*.

OPERATIONS 600 and 602 of the FIG. 6 example are the same as OPERATIONS 500 and 502, respectively, of the FIG. 5 example.

In response to receiving the NAS Join request, SMF 202 sends a Nsmf request to AMF 200 carrying a N2 SM location enquiry message (OPERATION 604).

In response to receiving the location enquiry message, AMF 200 retrieves from AMF memory a list of TAs supported by serving gNB 104*a* (earlier received by AMF 200 via NG-RAN Setup procedure) (OPERATION 606).

AMF 200 provides this retrieved list of TAs supported by serving gNB 104*a* to SMF 202. In more detail, AMF 200 includes the retrieved list of TAs in a Nsmf response message in reply to the Nsmf message received from SMF 202 (OPERATION 608).

OPERATIONS 610, 612 and 614 of the FIG. 6 example are the same as OPERATIONS 508, 510 and 512, respectively, of the FIG. 5 example.

Figure 7:
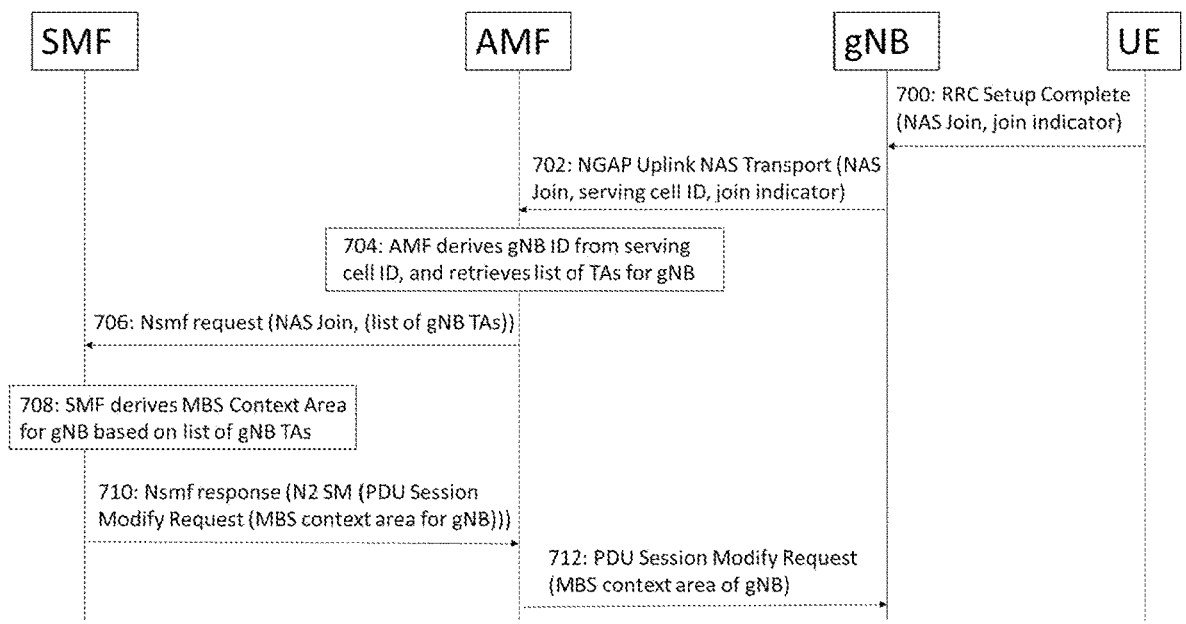
FIG. 7 shows a representation of another example of operations at components of FIG. 2 according to example embodiments.

FIG. 7 shows a representation of another example of operations at components of FIG. 2 according to another example embodiment.

UE 100 sends a NAS Join request to join a location-dependent multicast session (OPERATION 700). The NAS Join request specifies the MBS Session ID for the multicast session. In this FIG. 7 example, the NAS Join Request is carried by a RRC Setup Complete message. UE 100 sends the NAS Join request for forwarding by serving gNB 104*a* to AMF 200, and from AMF 200 to SMF 202 managing the established PDU session for the multicast session. The RRC Setup complete message at 700 includes a join indicator that is relayed by the gNB at 702 to trigger the AMF 200 to provide SMF 202 with a list of TAs supported by serving gNB 104*a* when forwarding the NAS Join request to SMF 202.

Serving gNB 104*a* forwards the NAS Join request and the join indicator to AMF 200 together with an indication of the cell ID for the cell serving UE 100 (OPERATION 702). In more detail, serving gNB 104*a* includes the NAS Join request, join indicator and serving cell ID in a NGAP Uplink NAS Transport message to AMF 200.

In response to receiving the NGAP Uplink NAS Transport message and detecting the join indicator, AMF 200 retrieves from AMF memory a list of TAs supported by the serving gNB (earlier received by AMF 200 as part of NG-RAN setup procedure) (OPERATION 704).

AMF 200 provides at 706 the retrieved list of TAs supported by serving gNB 104*a* to SMF 202 when forwarding the NAS Join request to SMF 202. In more detail: AMF 200 includes the retrieved list of TAs supported by serving gNB 104*a* in a Nsmf request message carrying the NAS Join request to SMF 202.

OPERATIONS 708, 710 and 712 of the FIG. 7 example are also the same as OPERATIONS 508, 510 and 512, respectively, of the FIG. 5 example described above.

According to one variation of the FIG. 7 example: the RRC Setup Complete message carrying the Join request includes an indicator triggering gNB 104 to retrieve (from gNB memory) the list of TAs supported by TA, and to forward the Join Request and the list of TAs supported by gNB 104 to AMF 200 for forwarding to SMF 202. This variation is otherwise the same as the FIG. 7 example, In each of the examples of FIGS. 3 to 7, the MBS context area selectively comprises a list of local service areas that map to the list of TAs received at the SMF. The MBS context area does not include the complete set of local service areas for the multicast session across the PLMN; the MBS context area selectively includes a sub-set of the complete set. Each local service area is expressed and known at the SMF 202 as a list of tracking area identifiers (TAIs) and cells. The MBS context area comprises an intersection of (a) the TAIs received at the SMF 202 in the Nsmf request message, and (b) the collection of TAIs and cells that define the full set of local service areas for the multicast session. The MBS context area=list of (Area Session ID, (list of TAIs and cells)).

In the examples described above, SMF 202 receives a list of TAs supported by the gNB 104 and derives the MBS context area for the gNB 104 from this list of TAs. According to one example variation, the SMF 202 instead receives the serving gNB identity or registration area (RA) identity of UE 100 or the list of cells of serving gNB; and derives the MBS context area sent to gNB 104 from this alternative information. In another variation, the SMF 202 receives a combination of the above such as list of TAs+list of cells matching the gNB. In one variation, The cell IDs of cells operated by a gNB have a part (e.g. leftmost bits) matching the gNB ID; and SMF 202 can derive the MBS context area from this part of the gNB ID.

According to another variation of the examples of FIGS. 4, 6 and 7, AMF 200 provides SMF 202 with the RA ID for UE 100 instead of a list of TAs supported by the gNB 104; and SMF 202 derives the MBS context area to be sent to the gNB 104 based on the one or more TAs that compose the identified RA.

For all of the examples described above: in response to detecting at gNB 104 that UE 100 is served by one of its cells that gNB 104 knows (based on the received MBS Context Area) belongs to a local service area for the multicast session, gNB 104 considers UE 100 for the multicast session in that cell. In the event that UE 100 is the first UE 100 to receive the multicast session via that cell/local service area, gNB 104 autonomously decides to request a session management function associated with the multicast session (MB-SMF/MB-UPF) to setup the user plane distribution for the multicast session for the cell/local service area.

The above-described techniques facilitate, for example, the operation of location dependent multicast sessions which have local service areas at the granularity of cells, such as e.g. vehicle-to-everything (V2X) services.

The above-described techniques can reduce signalling between gNB and SMF. The gNB does not need to request SMF for local service area information whenever UE handovers to another cell operated by the same gNB. The MBS context area received in a single message from SMF already provides a complete list of the subset of local service areas in which the gNB is involved from the larger set of all local service areas for the multicast session As mentioned above, the MBS context area provided to the gNB does not include a list of all local service areas for which the multicast session is provided across the PLMN (public land mobile network). The above-described technique is thus particularly suited to multicast sessions (such as e.g. multicast sessions for V2X services) that may have some location-dependent content at a cell (or few cells) level granularity, and for which the number of local service areas across the PLMN could be very many (e.g. thousands).

Figure 8:
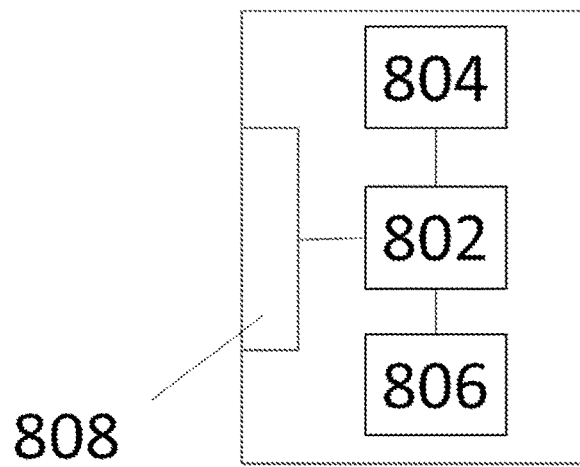
FIG. 8 shows a representation of an example of apparatus for implementing operations at a user equipment or RAN node according to some example embodiments.

FIG. 8 illustrates an example of an apparatus for implementing the operations of UE 100 or gNB 104 in the embodiments described above. The apparatus may comprise at least one processor 802 coupled to one or more interfaces 808. For the example of UE 100, the one or more interfaces 808 may be to e.g. other equipment for which the UE functionality 100 provides radio communications. For the example of gNB 104, the one or more interfaces 808 may be to e.g. core network nodes such as the node implementing the AMF 200. The at least one processor 802 is also coupled to a radio unit 804 including one or more antennas etc. for making and receiving radio transmissions. The at least one processor 802 may also be coupled to at least one memory 806. The at least one processor 802 may be configured to execute an appropriate software code to perform the operations described above. The software code may be stored in the memory 806.

Figure 9:
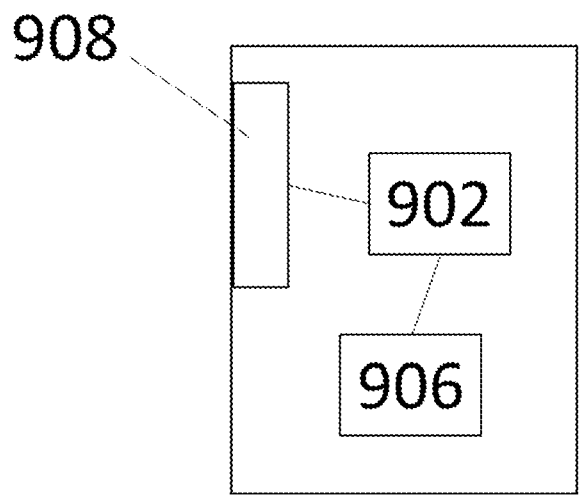
FIG. 9 shows a representation of an example of apparatus for implementing operations at a core network node according to some example embodiments.
Figure 10:
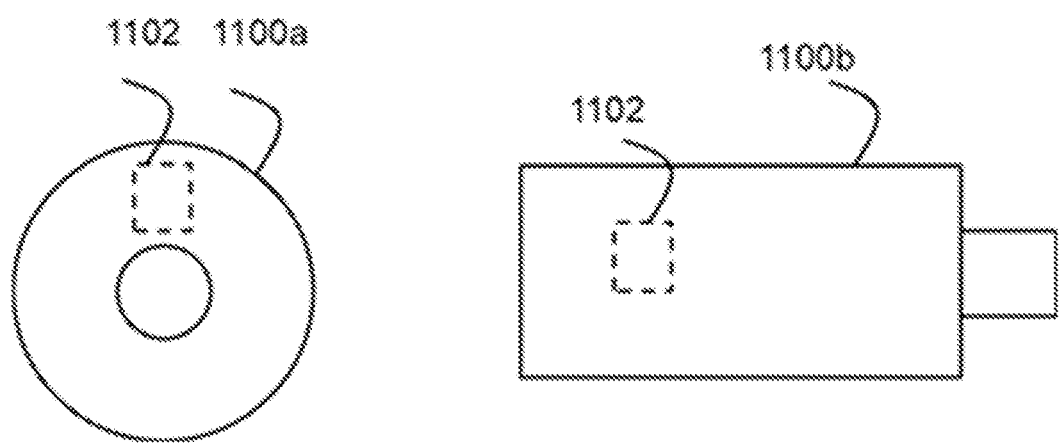
FIG. 10 shows a representation of an example of non-volatile memory media.

FIG. 9 illustrates an example of an apparatus for implementing a core network node such as the node implementing the AMF 200 or the node implementing the SMF 202 in the embodiments described above. The apparatus may comprise at least one processor 902 coupled to one or more interfaces 908. The one or more interfaces 908 may be for communication with RAN nodes 104 or other core network nodes. The at least one processor 902 may also be coupled to at least one memory 906. The at least one processor 902 may be configured to execute an appropriate software code to perform the operations described above. The software code may be stored in the memory 906.

FIG. 9 shows a schematic representation of non-volatile memory media 1100a (e.g. computer disc (CD) or digital versatile disc (DVD)) and 1100b (e.g. universal serial bus (USB) memory stick) storing instructions and/or parameters 1102 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as the base stations or user equipment of the above-described embodiments.

As used in this application, the term "circuitry" refers to all of the following: (a) hardware—only circuit implementations (such as implementations in only analog and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as the user equipment or base stations of the above-described embodiments, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. An apparatus, comprising:
   at least one processor; and
   at least one memory storing instructions of a session management function, wherein the instructions, when executed by the at least one processor, cause the apparatus at least to perform operations, the operations comprising:
   receiving a list of tracking areas identifiers that are associated with a radio access network node or an identity of the radio access network node;
   identifying, based on the list of tracking area identifiers that are associated with the radio access network node or the identity of the radio access network node, a subset of multicast service areas for a multicast session managed by the session management function, the subset of multicast service areas including a plurality of multicast service areas of a set multicast service areas for the multicast session; and
   directing towards the radio access network node, information indicative of the plurality of multicast service areas.

2. The apparatus according to claim 1, wherein the radio access network node comprises a target radio access network node for a handover of a user equipment associated with the multicast session.

3. The apparatus according to claim 1, wherein the receiving comprises receiving a reply to a request sent by the session management function, the reply including the list of tracking areas that are associated with the radio access network node or the identifier of the radio access network node.

4. The apparatus according to claim 1, wherein the receiving comprises receiving, from an access and mobility function, an access management function message carrying a message received from the radio access network node, the message comprising the list of tracking areas that are associated with the radio access network node or the identity of the radio access network node.

5. The apparatus according to claim 1, wherein the plurality of multicast service areas define a local service area associated with the radio access network node.

6. The apparatus according to claim 1, wherein the plurality of multicast service areas defines an area associated with a location of a user equipment associated with the multicast session.

7. The apparatus according to claim 1, wherein respective multicast service areas of the subset of multicast service areas include respective one or more of a plurality of cells operated by the radio access network node.

8. The apparatus according to claim 1, wherein the operations further comprise receiving, from a user equipment served by the radio access network node, a request to join the multicast session.

9. The apparatus as claimed in claim 1, wherein the identifying comprises identifying the plurality of multicast service areas of the set of multicast areas that map to the tracking area identifiers included in the list of tracking area identifiers.

10. An apparatus, comprising:
at least one processor; and
at least one memory storing instructions of an access and mobility function, wherein the instructions, when executed by the at least one processor, cause the apparatus at least to:
receive, from a radio access network node, a message carrying a join request and an identity of the radio access network, wherein the join request comprises a request for the user equipment to join a multicast session;
identify tracking areas associated with the identity of the radio access network node;
send, to a session management function managing the multicast session, a list of tracking areas identifiers, wherein the list includes tracking area identifiers for the tracking areas that are identified;
receive, from the session management function, information indicative of a subset of multicast service areas for the multicast session, the subset including a plurality of multicast service areas of a set of multicast service areas for the multicast session identified based on the list of tracking areas identifiers; and
forward to the radio access network node the information indicative of the subset of multicast service areas.

11. An apparatus for a radio access network node, the apparatus comprising:
at least one processor; and
at least one memory storing instructions that, when executed by the at least one processor, cause the apparatus at least to perform operations, the operations comprising:
sending, to a session management function configured to manage a multicast session associated with a set of multicast service areas or to an access management function for forwarding to the session management function, a list of tracking areas identifiers that are associated with a radio access network node or an identity of the radio access network node; and
receiving, from the session management function, information indicative of a subset of multicast service areas for the multicast session identified based on the list of tracking areas identifiers that are associated with the radio access network node or the identity of the radio access network node, wherein the subset including a plurality of multicast service areas of a set of multicast service areas for the multicast session identified based on the list of tracking areas identifiers.

12. The apparatus according to claim 11, wherein the operations further comprise sending the list of tracking areas identifiers that are associated with the radio access network node or the identity of the radio access network node to the session management function in a reply to a request received from the session management function.

13. The apparatus according to claim 11, wherein the sending is in response to determining that a radio resource control message received from a user equipment carries a join request from the user equipment requesting to join the multicast session.

14. The apparatus according to claim 11, wherein the sending comprises sending a path switch request comprising the list of tracking areas identifiers of the radio access network node to the access management function.

15. The apparatus as claimed in claim 11, wherein the operations further comprise:
receiving, from a user equipment, a radio resource control message carrying a join request requesting for the user equipment to join the multicast session; and
wherein the sending comprises, sending, after receipt of the radio resource control message, a message to the access and mobility function, the message carrying the join request and the identity of the radio access network node.

* * * * *